United States Patent
Freda et al.

(10) Patent No.: US 8,737,323 B2
(45) Date of Patent: May 27, 2014

(54) METHOD AND APPARATUS FOR USING DIRECT WIRELESS LINKS AND A CENTRAL CONTROLLER FOR DYNAMIC RESOURCE ALLOCATION

(75) Inventors: Martino M. Freda, Laval (CA); Jean-Louis Gauvreau, La Prairie (CA); Joseph Murray, Schwenksville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 241 days.

(21) Appl. No.: 12/844,306

(22) Filed: Jul. 27, 2010

(65) Prior Publication Data
US 2011/0026474 A1 Feb. 3, 2011

Related U.S. Application Data

(60) Provisional application No. 61/229,109, filed on Jul. 28, 2009, provisional application No. 61/301,308, filed on Feb. 4, 2010.

(51) Int. Cl.
*H04Q 7/00* (2006.01)
*H04W 72/04* (2009.01)
*H04W 76/02* (2009.01)

(52) U.S. Cl.
CPC ........ *H04W 72/0433* (2013.01); *H04W 76/023* (2013.01)
USPC .......................................... 370/329; 375/260

(58) Field of Classification Search
CPC ...... H04W 72/04; H04W 76/00; H04W 88/08
USPC ..................... 370/312, 346; 455/41.2; 725/80
See application file for complete search history.

(56) References Cited

U.S. PATENT DOCUMENTS

| | | | | |
|---|---|---|---|---|
| 2002/0141398 | A1* | 10/2002 | Qiao et al. | 370/360 |
| 2002/0143966 | A1* | 10/2002 | Sibecas et al. | 709/229 |
| 2005/0282494 | A1* | 12/2005 | Kossi et al. | 455/41.2 |
| 2007/0157258 | A1* | 7/2007 | Jung et al. | 725/80 |
| 2009/0269083 | A1* | 10/2009 | Cho et al. | 398/212 |
| 2010/0037071 | A1* | 2/2010 | Chang | 713/310 |

OTHER PUBLICATIONS

Guocong Song, and Ye (Geoffrey) Li, Cross-Layer Optimization for OFDM Wireless Networks—Part II: Algorithm Development. IEEE Transactions on Wireless Communications, vol. 4, No. 2, Mar. 2005.*
Sally Adee, "Ultraviolet Radios Beam to Life," IEEE Spectrum, May 2009.
Chen et al., "Experimental Evaluation of LED-Based Solar Blind NLOS Communication Links," Optics Express, vol. 16, No. 19, pp. 15059-15068, Sep. 2008.
Chen et al., "Path Loss Modeling and Performance Trade-Off Study for Short-Range Non-Line-of-Sight Ultraviolet Communications," Optics Express, vol. 17, No. 5, pp. 3929-3940, Mar. 2009.
International Commission on Non-Ionizing Radiation Protection, "Guidelines on Limits of Exposure to Laser Radiation of Wavelengths Between 180 nm and 1,00um, " ICNIRP Guidelines, pp. 804-819, Jun. 1996.

(Continued)

*Primary Examiner* — Wanda Z Russell
(74) *Attorney, Agent, or Firm* — Volpe and Koenig, P.C.

(57) ABSTRACT

A method and apparatus for short range multi-device communications in personal area networks (PANs) using ultraviolet bands.

21 Claims, 9 Drawing Sheets

(56) References Cited

OTHER PUBLICATIONS

International Commission on Non-Ionizing Radiation Protection, "Guidelines on Limits of Exposure to Ultraviolet Radiation of Wavelengths Between 180 NM and 400 NM (Incoherent Optical Radiation), " ICNIRP Guidelines, pp. 171-186, Apr. 2004.

Ma et al., "Rate-Maximization Scheduling Schemes for Uplink OFDMA," IEEE Transactions on Wireless Communications, vol. 8, No. 6, Jun. 2009.

Zhengyuan Xu, "Approximate Performance Analysis of Wireless Ultraviolet Links," IEEE International Conference on Acoustics, Speech and Signal Processing, Honolulu, Hawaii, Apr. 15-20, 2007.

Xu et al., "Analytical Performance Study of Solar Blind Non-Line-of-Sight Ultraviolet Short-Range Communication Links, " Optics Letters, vol. 33, No. 16, pp. 1860-1862, Aug. 2008.

Xu et al., "Ultraviolet Communications: Potential and State-of-the-Art," IEEE Communications Magazine, pp. 67-73, May 2008.

* cited by examiner

METHOD AND APPARATUS FOR USING DIRECT WIRELESS LINKS AND A CENTRAL CONTROLLER FOR DYNAMIC RESOURCE ALLOCATION

CROSS REFERENCE TO RELATED APPLICATION

This application claims the benefit of U.S. Provisional Application Ser. No. 61/229,109 filed on Jul. 28, 2009 and U.S. Provisional Application Ser. No. 61/301,308 filed on Feb. 4, 2010 hereby incorporated by reference as if fully set forth herein.

FIELD OF INVENTION

This application is related to wireless communications.

BACKGROUND

Ultraviolet (UV) communication is a form of optical wireless communication that operates in the UV band. This band of electromagnetic (EM) radiation is located between visible light 150 and x-rays 160 in the EM spectrum 100. The location of UV in the EM spectrum 100 is shown in FIG. 1.

Based on absorption properties of UV radiation in the earth's atmosphere, the UV band is divided into four main sub-bands. Vacuum UV (10 nm-200 nm) 110 is heavily absorbed by oxygen molecules in the atmosphere. UV-C (200 nm-280 nm) 120 is fully absorbed by the ozone layer and only exists on the earth's surface through manmade sources. UV-B (280 nm-315 nm) 130 is partially absorbed by the ozone layer and is the primary agent responsible for sunburns. Finally, UV-A (315 nm-400 nm) 140 is not absorbed by the ozone layer and constitutes 98.7% of the UV radiation that reaches the earth's surface from the sun.

UV-C communication is preferably suited for short-range, low power networking. The inherent security also makes this technology ideal for networks that are used to communicate sensitive or personal information. The fact that UV-C does not operate in the radio frequency (RF) band allows it to be used in situations where RF communication may create interference or could be dangerous (e.g., hospitals, airplanes, refineries, chemical plants, etc.).

UV-A has more relaxed exposure limits when compared with UV-C, ranging from 300× to 13000×, depending on the UV-A wavelength. This may allow transmitters with higher powers to be used in a personal communication system. When compared with visible light, UV-A also has more relaxed laser exposure limits (up to 20×) due to the fact that the human retina is not sensitive to UV-A. UV-A maintains the security aspects of UV-C, as it also does not penetrate through walls, and penetration through regular glass is limited to wavelengths above ~325 nm (depending on the type of glass). Special transparent filters also exist which allow UV-A to be blocked by glass all the way to the start of the visible light spectrum (~400 nm).

With the proliferation of wireless devices, exchange of information between devices during meetings has become a common need. This data exchange must also be able to support large bandwidths, such as in the case of projecting of a corporate strategy video during a board meeting, or for rapid transfer of large confidential documents between board member smart phones or laptops. While wireless network security applications have been developed with this in mind, wireless networks will remain highly susceptible to eavesdropping as long as there is a means for an eavesdropper to intercept network traffic. This is always possible in the case of RF communications where this type of communication medium cannot be confined to a closed room, where a secure meeting generally takes place.

With the advent of new applications such as high resolution video, the need for wireless technologies to support these new high bandwidth applications has increased. However, many of the existing personal area network (PAN) technologies today (such as Bluetooth, which can achieve an expected 1-3 Mbps) lack these required data rates.

Finally, as new technologies are deployed to allow for short range indoor communication and as these technologies take advantage of new or existing frequency bands, the chance for interference of these new technologies with devices that are sensitive to RF communications may increase. This may be true in the case of equipment used in hospitals, airplanes, and chemical plants.

Technologies using 60 GHz, Terahertz, infrared 170, visible light 150 and UV spectrum have the potential for solving each of these issues or needs. It would be advantageous to share a secure spectrum by multiple devices (each with its own security requirements) while staying within the limits for safe transmission power levels and minimizing interference using a physical layer (PHY) that allows for flexible bandwidth allocation and power control.

SUMMARY

A method and apparatus for short range multi-device communications in personal area networks (PANs) using ultraviolet bands.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, a site controller, an access point (AP), or any other type of interfacing device capable of operating in a wireless environment.

The properties of the electromagnetic (EM) spectrum that may be of most interest from a security standpoint are range and the ability to penetrate materials. As the frequency increases, the range and the ability to penetrate materials may also decrease. Technologies that lend themselves to secure short range communications (SSRC), include but are not limited to: extremely high frequency (EHF) (30-300 GHz), Terahertz (300-3000 GHz), and Optical (infrared, visible light, and ultra violet (UV)) bands.

SSRC technologies, including but not limited to: EHF, Terahertz and Optical, are types of EM radiation that exhibit features that may be used to allow secure, high-bandwidth data communication between WTRUs in a personal area network (PAN), local area network (LAN), or machine-to-machine (M2M) network. Although UV is described herein, any type of EM radiation that exhibits some or all of the properties of SSRC technologies, including but not limited to: EHF, Terahertz or Optical, may be used in the methods and apparatus introduced herein to achieve secure high bandwidth communication. In particular, several properties of EM radiation are of interest. First, the ability to be confined within an enclosure where the communication will take place, whether it is via walls or other means. Next, the ability to provide non-line-of-sight (NLOS) communication within that enclosure despite the presence of obstacles. This may be achieved by scattering, reflecting, or re-directing the EM radiation either naturally off of walls or the wireless medium itself, or using enabling devices such as reflectors. Finally, the ability to provide large amounts of unlicensed bandwidth for use in communication systems is of interest.

Figure 1:
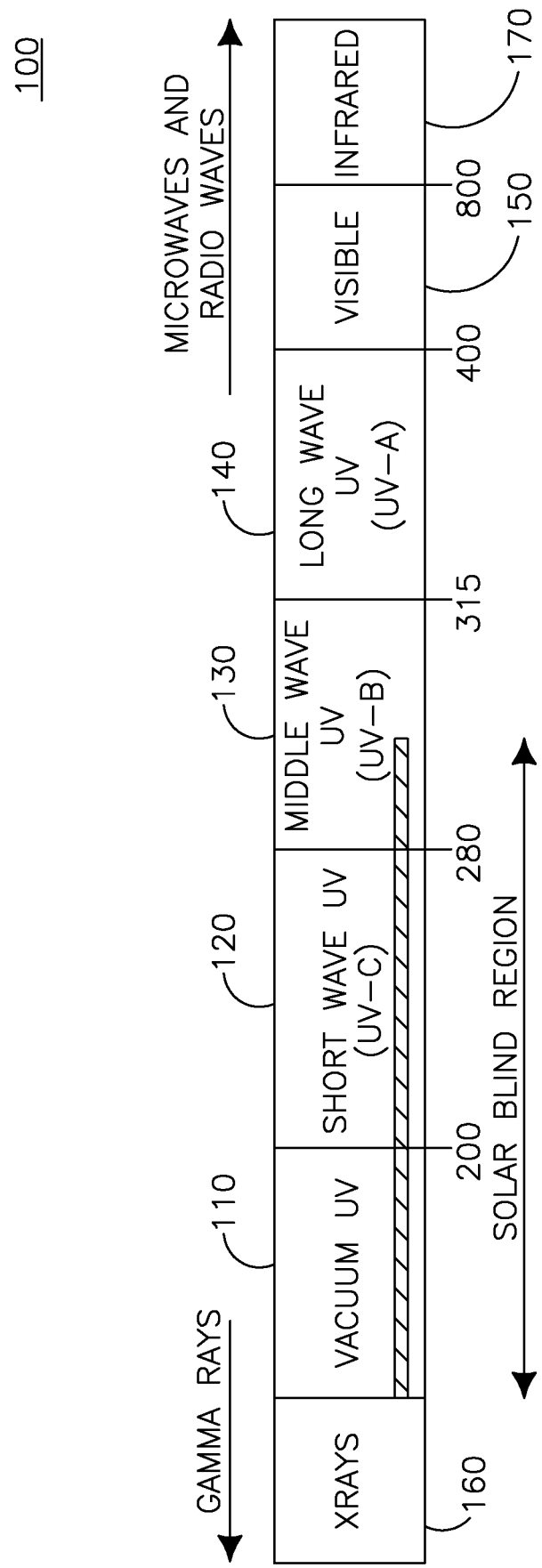
FIG. 1 shows the location of UV in the EM spectrum.
Figure 2A:
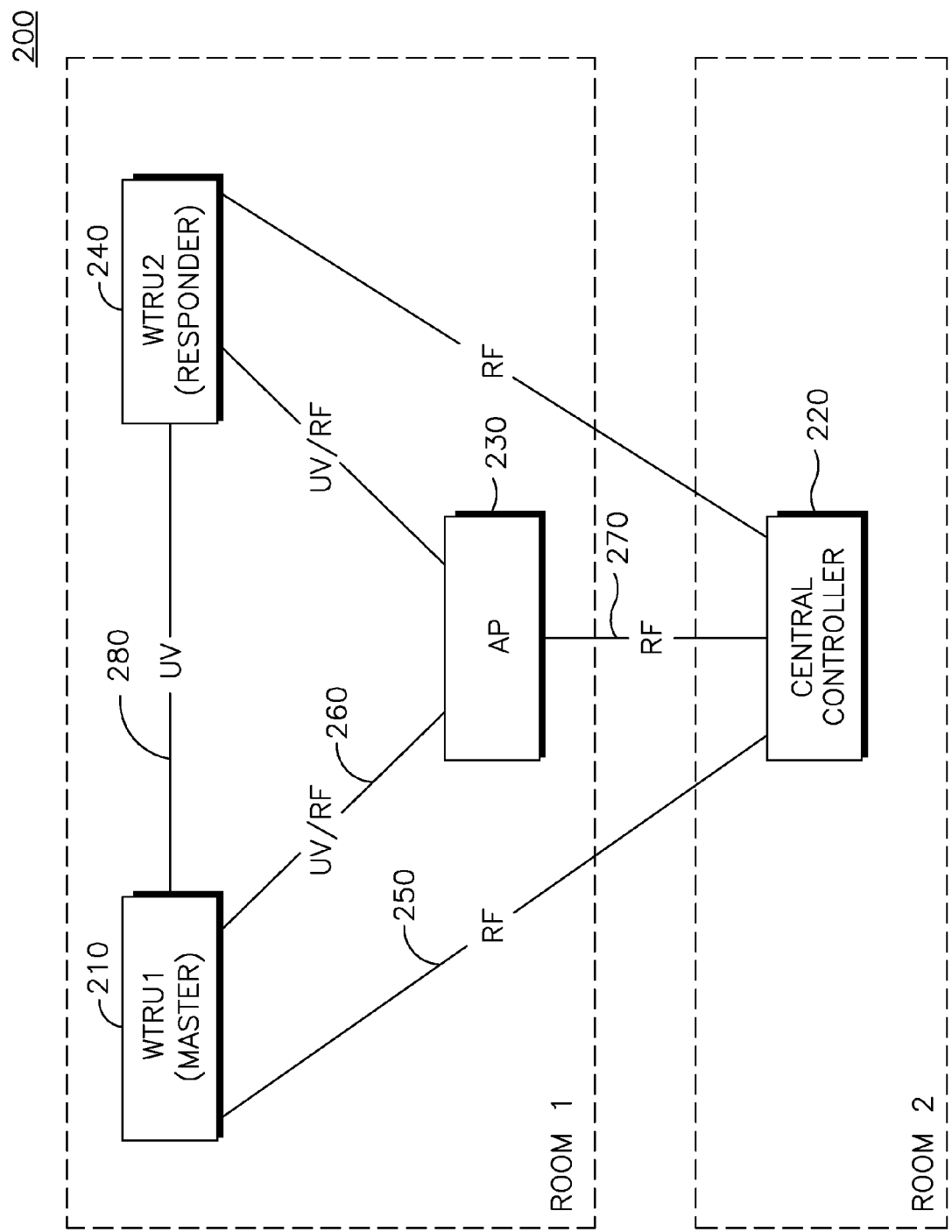
FIG. 2a shows a high level block diagram of a UV personal area network (PAN) with an access point (AP)

FIG. 2a is a high level block diagram of a PAN 200. An orthogonal frequency division multiple access method (OFDMA) may be used within the PAN. While UV is primarily shown in this figure, radio frequency (RF), EHF, Terahertz and Optical technologies, may also be used. The PAN may be located within a single room (Room 1). A plurality of WTRUs exchanging data using direct UV links 280 may be located within Room 1, along with an access point (AP) 230. Device communication is realized using orthogonal frequency-division multiplexing (OFDM) in order to make use of the robustness to frequency selective fading and multiple access capabilities.

The central controller (CC) 220 may be located in a location other than Room 1 (e.g., Room 2). Communication between the WTRUs and the CC may be through RF based radio access technology (RAT) 250, if the CC is located outside of Room 1.

Each room may also have its own AP 230, which may be connected to all other APs in other rooms via a RF connection 270 through the CC 220. The AP 230 may be placed on the ceiling of the room in order to ensure line-of-sight (LOS) communication with all devices within the room, which may ensure a high bandwidth link to the CC 220.

When a WTRU (e.g. WTRU1, master) 210 decides to set up a direct link with another WTRU (e.g. WTRU2, responder) 240, WTRU1 210 sends a message to the AP 230 located in Room 1 via UV or via RF 260. The AP 230 receives the message via UV or via RF 260. If the message is received via UV, the AP converts the message to an RF signal 270 in order to transmit it to the CC 220, located outside of Room 1. Once the CC 220 receives the message, the CC 220 determines communication parameters such as allocating bandwidth (i.e., OFDM subcarriers) and specific wavelengths for use by WTRU1 210 when communicating with WTRU2 240 within the PAN 200. This information is transmitted to the AP 230 via an RF signal 270. The AP 230 receives the message via RF 270 and may convert the message to transmit it to WTRU1 210 and/or WTRU2 240 via ITV 260 or may transmit the message via RF. Once WTRU1 210 and/or WTRU2 240 receive the communication parameters WTRU1 210 establishes a UV direct communication link 280 with WTRU2 240 in order to exchange data.

Direct ITV links, such as the link established between WTRU1 210 and WTRU2 240 may be used when high data rate and/or high security point-to-point services may be required. The architecture may comprise a standard RF link between the WTRU and the base station and/or between the base station and the CC, and a direct ITV link between WTRUs. The RF link may be capable of penetrating walls, thereby allowing the base station, WTRU and CC to be physically located in different rooms. However, a direct ITV link may not be capable of penetrating walls, thereby requiring WTRUs that form a direct UV link to be physically located in the same room.

Figure 2B:
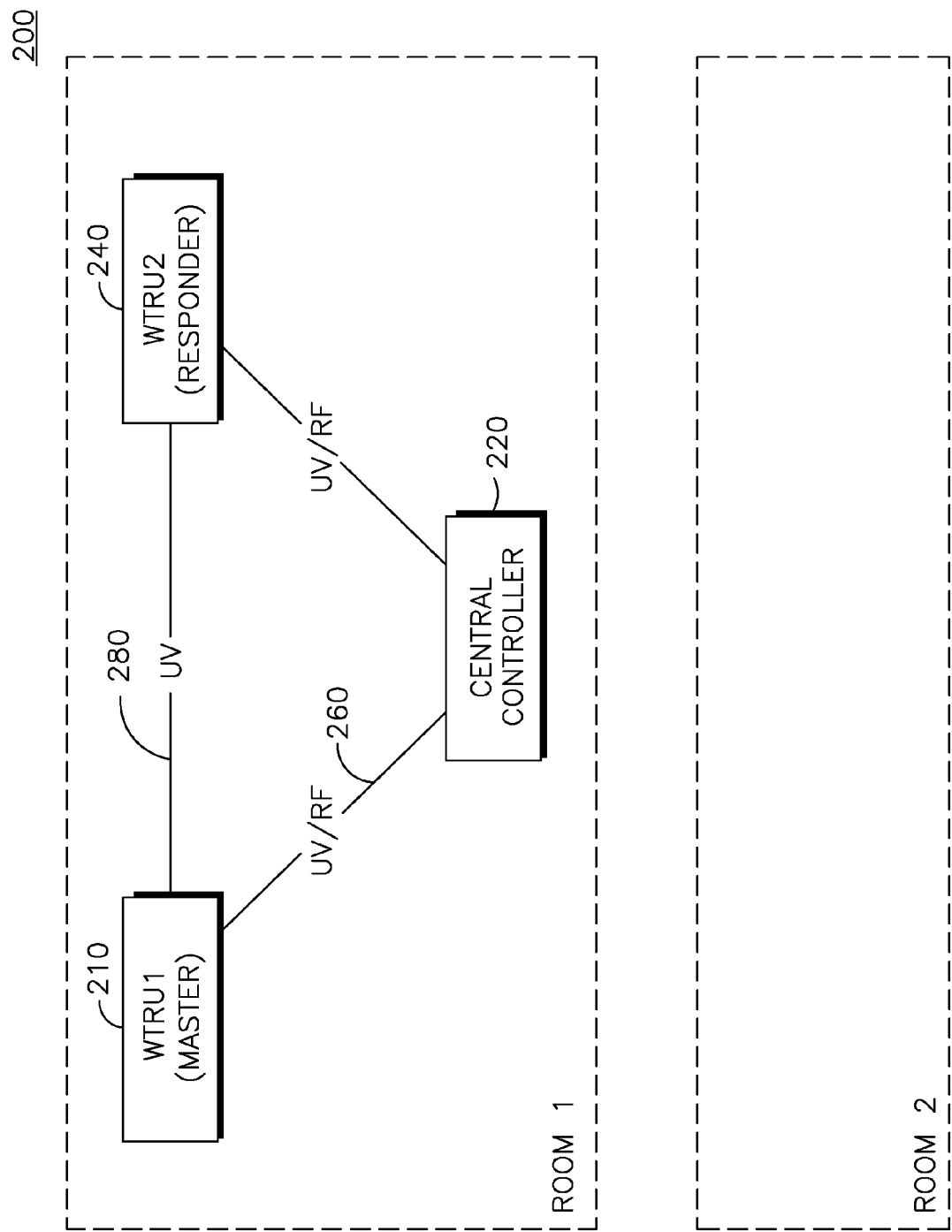
FIG. 2b shows a high level block diagram of a UV PAN without an AP.

FIG. 2b is a high level block diagram of a UV PAN 200 where a plurality of WTRUs exchanging data using direct UV links may be located within Room 1 along with a CC 220. Communication between the WTRUs and the CC 220 may be through UV or RF.

When a WTRU (e.g., WTRU1, master) 210 decides to set up a direct link with another WTRU (e.g., WTRU2, responder) 240, WTRU1 210 sends a message to the CC 220, located in Room 1. The message is sent directly to the CC 220 via UV or RF 260. Once the CC 220 receives the message, the CC 220 determines communication parameters such as allocating bandwidth (i.e., OFDM subcarriers) and specific wavelengths (i.e., UV-A or UV-C) for use by WTRU1 210 when communicating with WTRU2 240 within the PAN 200. This information is transmitted directly to WTRU1 via UV or RF 260. Once WTRU1 210 receives the communication parameters it establishes a UV communication link 280 with WTRU2 240 in order to exchange data.

Figure 3:
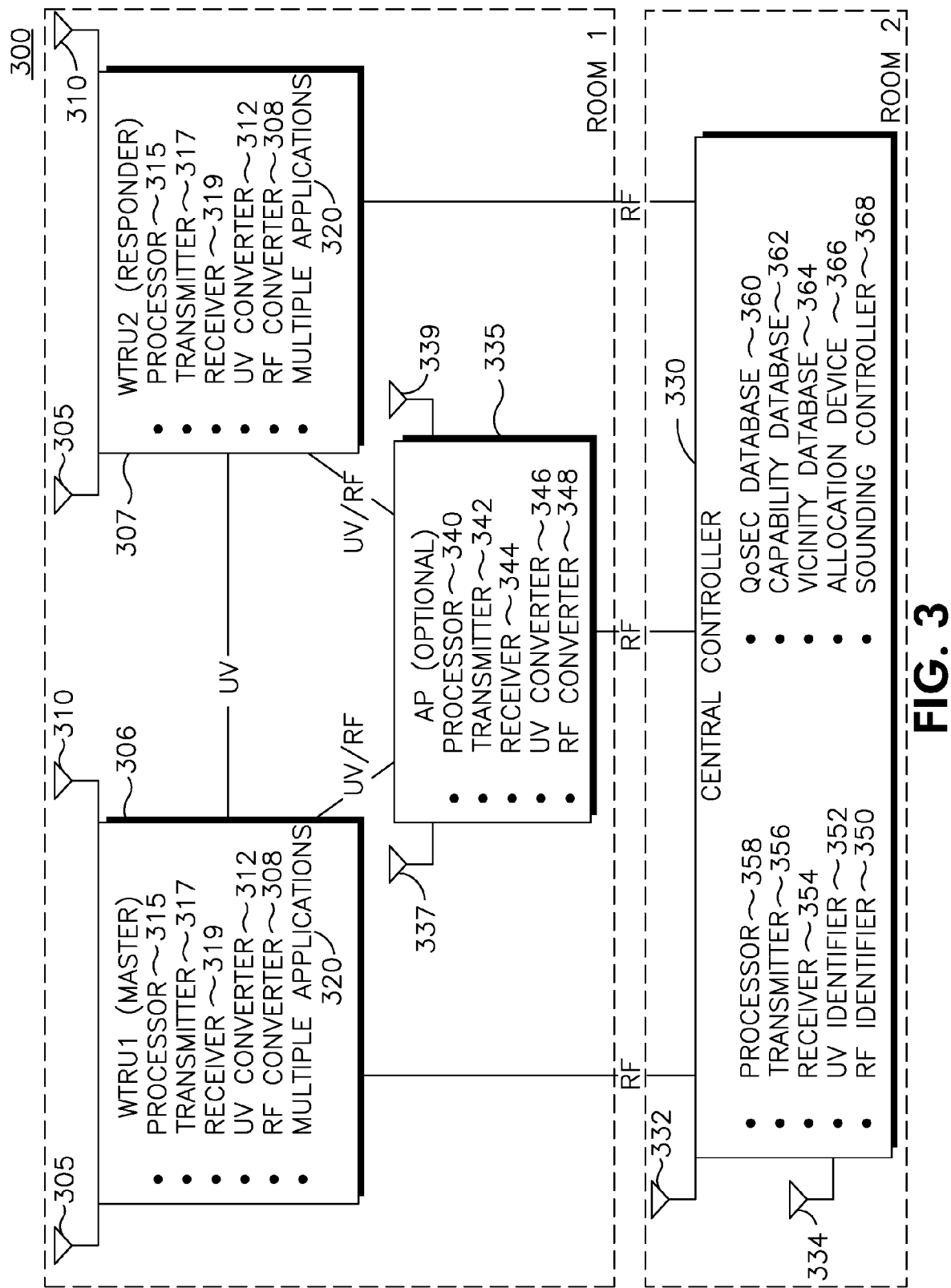
FIG. 3 shows a detailed example of a PAN network.

FIG. 3 is a detailed example of a PAN 300. FIG. 3 may include a plurality of WTRUs. Each WTRU may be capable of both UV and RF communications and may include a RF antenna 305 and a UV antenna 310 as well as a RF converter 308 to identify, track and convert radio waves and an UV converter 312 to identify, track and convert UV waves. In addition, each WTRU may include a processor 315, transmitter 317 and a receiver 319. Each WTRU may also be equipped with multiple applications 320. When the CC 330 is located in a different room, WTRUs may be required to support a LTV air interface for WTRU to WTRU communication and an 802.11 interface for communication with the CC 330.

An AP 335 may also be included in the LTV PAN 300. The AP 335 may be located in the same room as the plurality of WTRUs and may be capable of both UV and RF communications. The AP may include a RF antenna 337 and a UV antenna 339 as well as a RF converter 348 and an UV converter 346. In addition, the AP may include a processor 340, transmitter 342 and a receiver 344.

A CC 330 may be included in the UV PAN 300. The CC 330 may be located either within the same room as the plurality of WTRUs, Room 1, or may be located in a location other than Room 1. The CC 330 may be capable of both UV and RF communications and may include a RF antenna 332 and a UV antenna 334 as well as a RF converter 350 and an UV converter 352. The CC 330 may include a processor 358, transmitter 356 and a receiver 354.

The CC 330 may also include a quality of security (QoSec) database 360. The QoSec database may include a listing of WTRUs within the vicinity of the CC 330 and a listing of each application associated with each individual WTRU within the vicinity of the CC. Each application for each WTRU is tagged with a level of security. Alternatively, or in combination with providing a security level for each application, a level of security may be assigned to a WTRU itself. Each application associated with a WTRU that has been assigned a level of security may be tagged with the WTRUs assigned level of security. Alternatively, or in combination with the above, WTRUs may be assigned to a group. A level of security may be assigned to the group. WTRUs that are part of the same group may all be tagged with a specified level of security. Each application associated with a WTRU included in a group may be tagged with the WTRUs assigned level of security. This may facilitate a set of security classes for WTRUs operating on a network.

The levels of security may be defined as low, medium and high or may include additional levels of granularity. Certain security features may be associated with each level of security. For example, applications requiring a high level of security, such as those used to exchange encryption keys, may be allocated with security features such as wavelengths in a band with propagation characteristics that require transmissions to be contained within a room. This may prevent the transmission from penetrating glass windows. Applications requiring a low level of security, such as communications after encryption, may be allocated with wavelengths in a band that may penetrate walls. In addition, the level of security and the security features associated with an application may vary between WTRUs and groups of WTRUs. Alternatively, security features may be assigned to a WTRU or a group of WTRUs.

The CC 330 may also include a capability database 362. The capability database 362 may include a listing of WTRUs within the vicinity of the CC 330 and specific information regarding each of the WTRUs. The capability database 362 may also include information regarding the PAN.

The capability database includes a data rate and specific capability information for each WTRU and each device in the PAN. The specific capability information may include but is not limited to, the ability of each device to transmit using particular SSRC technology, including but not limited to: EHF, Terahertz or Optical wavelengths, the presence or absence of RF capabilities on the device, and whether the device is equipped with directionality capabilities. The capability database 362 may also include the security class or classes associated with a device, namely the amount of security that is guaranteed through transmission by the device.

In addition to WTRU specific information, the capability database 362 may also contain information about the total UV radiation currently within the room where the WTRU resides and the total amount of allowable exposure at each point in the room. This information may be used by the CC 330 in order to determine how devices communicate and to allocate LTV spectrum or set transmission (TX) power levels for WTRUs that request communication via a direct link.

The CC may also include a vicinity database 364. The vicinity database 364 may be built and maintained through information obtained by the channel sounding procedure described herein. The vicinity database 364 may include a listing of WTRUs within the vicinity of the CC 330 and may include information relating to the association of a WTRU to a particular room. The vicinity database 364 may also include information that is needed to determine if and how two WTRUs may communicate with each other. This information may include directionality information (i.e., the angle between two WTRUs or the angle between a WTRU and the CC 330) and range information (i.e., whether a first WTRU is in the range of a second WTRU and if either UV-A or UV-C is used by the WTRU).

WTRU mobility properties, procedures and a mobility history of the WTRU may be used by the channel sounding procedure and may be included in the vicinity database 364. The vicinity database may include mobility information such as how frequently a WTRU is moved and may also contain channel estimates for the links between the CC 330 and the WTRUs.

The CC 330 may also include an allocation device 366. The allocation device 366 may include a loading algorithm. The loading algorithm may use OFDM to determine the allocation of subcarriers and wavelengths (i.e., UV-A or UV-C) for each WTRU. The loading algorithm may utilize the channel conditions or channel estimates stored in the capability database to determine the allocation of wavelengths for each WTRU. Channel estimates stored in the capability database may be derived by the channel sounding procedure and may be updated through the transmission of pilot signals within the data during normal transmission within the chosen wavelength.

Also considered by the loading algorithm for the allocation of subcarriers and wavelengths, may be the maximum allowable transmit power for each WTRU. The maximum allowable transmit power may be based on both the WTRU's capabilities for transmitting on that wavelength as well as the maximum safe exposure limits of UV-A and UV-C within the room. This form of spectrum allocation may ensure a maximum amount of flexibility in terms of security, required data rate, and reliability of transmission in the presence of interference from sunlight and other WTRUs. Subcarriers and wavelengths may also be allocated with network assistance.

The CC 330 may include a channel sounding controller 368. The channel sounding controller 368 controls the channel sounding procedure, which is used to characterize the channel and determine which WTRUs are within the vicinity of each other and within the vicinity of the CC 330. The channel sounding procedure may be triggered by many different events including but not limited to when a request for association is made to the CC 330, when a request to setup a direct link with another WTRU is made, upon the expiration of a timer or in response to an asymmetric event.

An asymmetric event may include but is not limited to a user request, a change in location of the WTRU due to mobility, or the arrival/detection/departure of a new device in a room, in the vicinity of the WTRU or in the range of the CC.

When the new device detects the presence of a CC, it associates itself with the CC. Upon doing so, the CC may trigger the channel sounding procedure, whereby the new device and other devices in the vicinity may send a reference signal to the CC. This process may determine the devices that may directly communicate with the new device. The channel sounding procedure may also allow updating of the vicinity and the capability databases based on the presence of the new device. This may also trigger the readjustment of the transmit powers and subcarrier allocations on ongoing direct links in order to allow for communication between the new device and other devices or the CC.

To alleviate the need for dual RAT support (both a RF and a UV air interface), a local base station may be used inside of each room. In this approach, the devices may support a UV-based air interface and may communicate with the local base station using UV signals. While direct UV links may be established between devices within the same room, an RF link may be established between the local base station and a CC located outside the room. In this embodiment, the local base station may be both an RF-based WTRU connected to the CC and a UV-based base station connected to the UV-based WTRUs using a dual protocol stack based on 802.11 as shown in FIG. 4.

Figure 4:
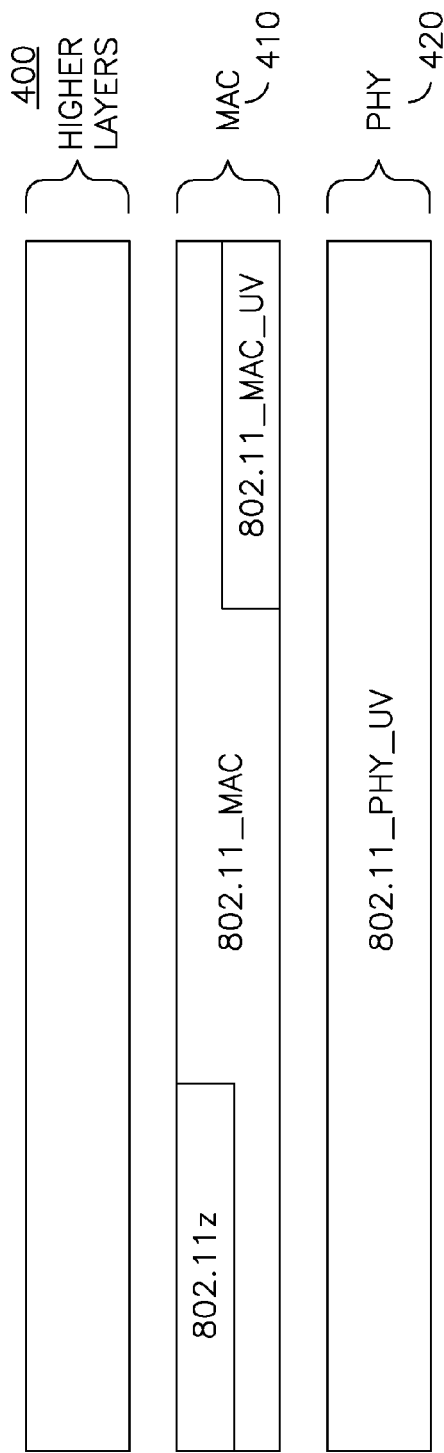
FIG. 4 shows a protocol stack based on 802.11.

FIG. 4 shows a UV-enhanced 802.11 protocol stack for a device that supports UV 400. The 802.11_MAC 410 may extend the capabilities of the standard 802.11 MAC by providing lower-MAC functions that may be used to interface with the 802.11_PHY_UV layer 420. The 802.11_PHY_UV 420 protocol may be based on an OFDM air interface.

Figure 5:
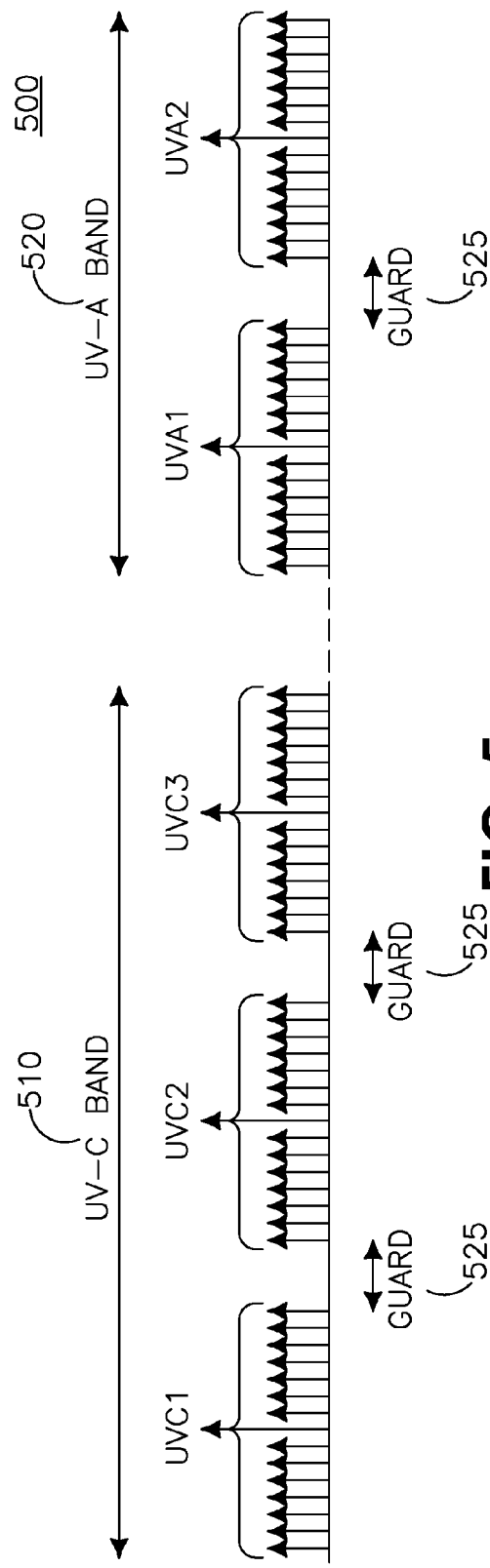
FIG. 5 shows an OFDM-based spectrum allocation method.

FIG. 5 shows an OFDM-based spectrum allocation method 500. In FIG. 5, three UV-C bands 510 and two UV-A bands 520, each separated by guard bands 525, may make up the entire UV spectrum. Each band may then be separated into a set of subcarriers through the use of OFDM, which may reduce the impact of multipath in each band caused by scattering and reflection of UV-C or UV-A. Application of the Inverse Fast Fourier Transform (IFFT) by the master WTRU, WTRU1, may be applied in the electrical domain (prior to optical modulation), and the resulting waveform may be used to optically modulate a carrier that may be centered at each of the five UV bands. A different number of UV-C and UV-A bands may be allocated depending on the UV bandwidth used, or the number of subcarriers for each of the bands. Devices that support only UV-A or only UV-C may also be possible.

Figure 6:
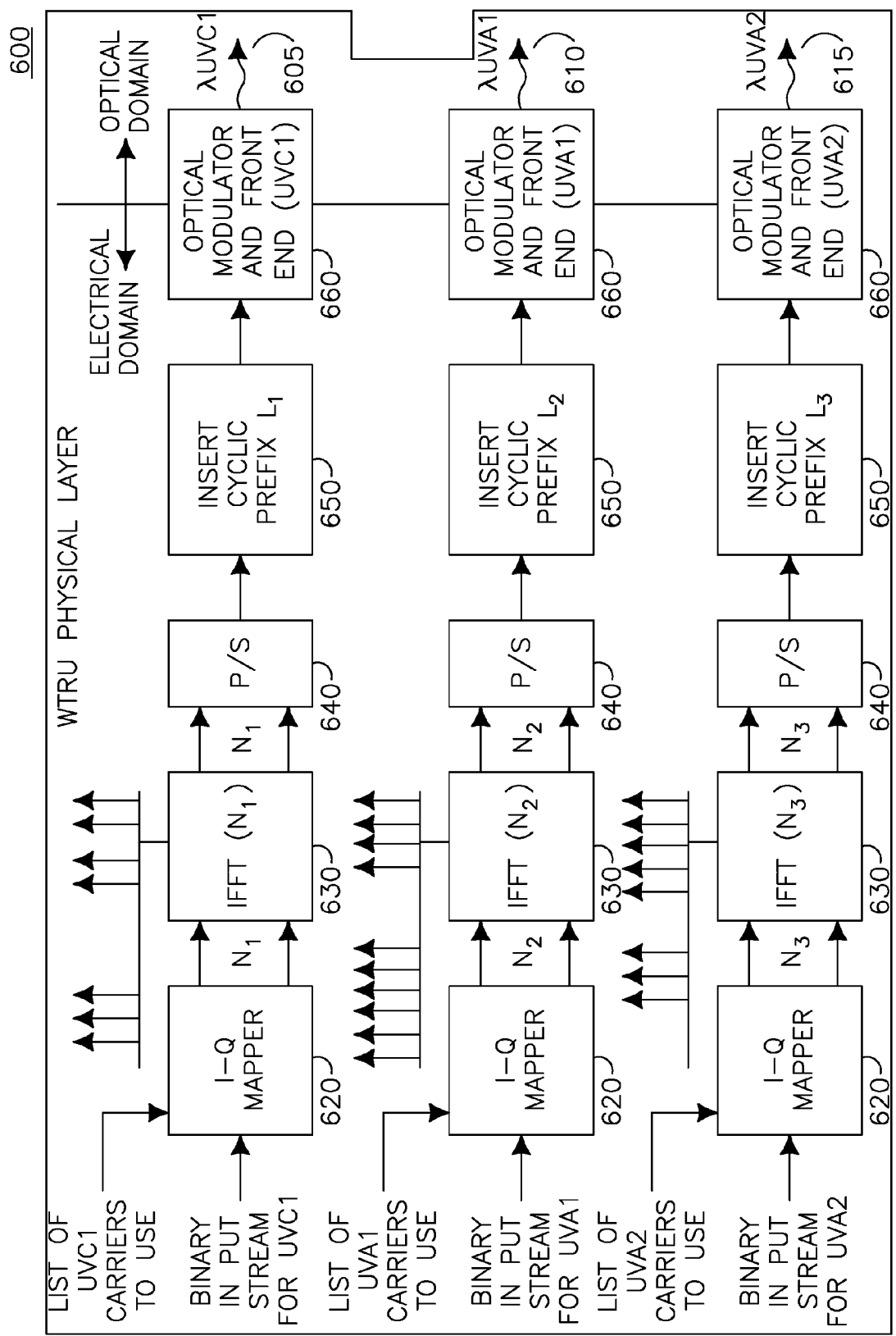
FIG. 6 shows the main physical layer stages in a master WTRU.

FIG. 6 shows the main physical layer stages 600 in a master WTRU, WTRU1, which may use OFDM and may make use of spectrum aggregation. In this example, the master WTRU, WTRU1, has been assigned carriers on only two UV-A wavelengths 610, 615 and only one UV-C wavelength 605. The number of separate transmit chains in the transmitter may be as large as the number of total spectral bands used by the system, depending on how many wavelengths are allocated to that WTRU. Spectrum from a plurality of bands may be aggregated using multiple transmit chains wherein each transmit chain optically modulates a specified wavelength.

I-Q Mappers 620 receive lists of UV carriers and binary input streams. The I-Q Mappers output the received information to an IFFT 630. In the IFFT 630, data from different streams may be loaded onto the subcarriers assigned to WTRU1 for each LTV wavelength. Subcarriers that are not assigned to a particular WTRU may be loaded with zero. After the IFFT 630, the information is transmitted to a pilot/training sequence (P/S) element 640 where the streams of multiple data elements, received simultaneously, are converted into a stream of data elements transmitted in time sequence. A cyclic prefix 650 is then added to the stream. After the addition of a cyclic prefix 650, each time-domain sequence may be optically modulated 660 onto the associated UV wavelength and all wavelengths may be transmitted in parallel. To further increase the flexibility of the spectrum aggregation method, each UV band may employ a different configuration of pilot/training sequence length and placement, fast fourier transform (FFT) size, and cyclic prefix length. This may ensure that the overall physical layer is tailored to the differences in optical channel characteristics between UV-A and UV-C.

Figure 7:
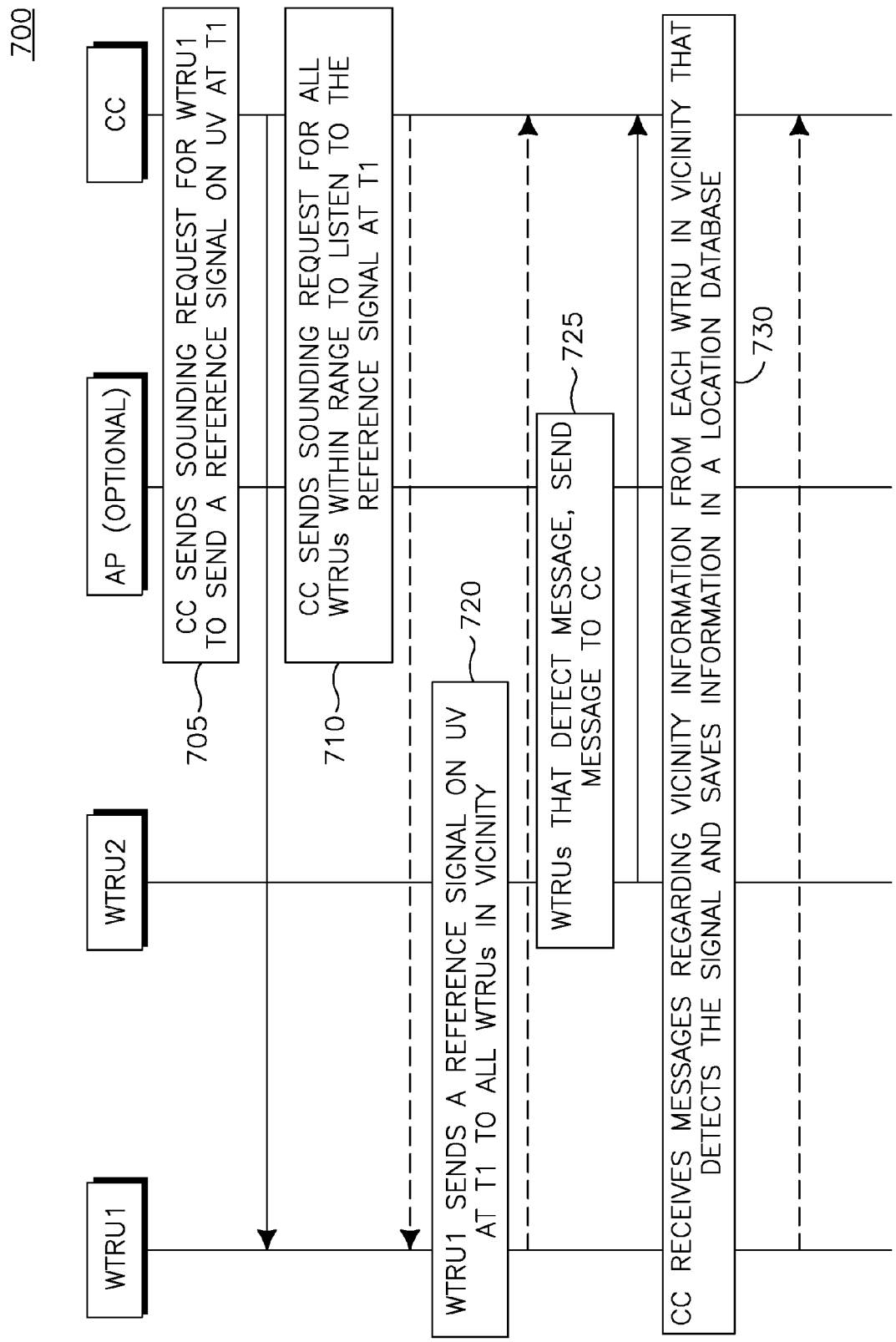
FIG. 7 shows a flow diagram of a channel sounding process.

FIG. 7 is a flow diagram of the a channel sounding process 700. If the channel sounding controller in the CC is triggered, the CC sends a channel sounding request to WTRU1 705. The channel sounding request may include information such as a specific UV wavelength and a specific time (T1) for WTRU1 to send a reference signal. Alternatively, the channel sounding request may be sent to more than one WTRU, as a broadcast or multicast channel sounding request. In order to avoid channel sounding collisions, whereby multiple WTRUs send a reference signal, a random backoff may be used. The random backoff may occur prior to transmission of the reference signal. The random backoff may be calculated by each WTRU or may be signaled via the channel sounding request.

The CC may send a channel sounding notification to all WTRUs within range to listen for the reference signal(s) at the specific LTV wavelength(s) and at the specific time(s) (T1) 710. The channel sounding notification may be sent in the same transmission as the channel sounding request or may be sent using a separate transmission. The channel sounding notification may also include instructions regarding how each WTRU is to respond to the reference signal. The channel sounding request and/or notification may be sent using SSRC including but not limited to EHF, Terahertz or Optical wavelengths or an alternate air interface such as RF.

WTRU1 may send the reference signal on the specified UV wavelength at the specified time (T1) 720. The reference signal may include a field which may be used to identify the transmitting WTRU (e.g., a subscriber identity, or MAC address). Each WTRU that detects the reference signal may send a message to the CC, based on instructions in the channel sounding notification, and/or in accordance with a predefined procedure 725. The message may include vicinity and channel condition information for the WTRU 725. The CC receives this information and may store this information in either the vicinity database or the capability database 730, based on the information received. Each device may also include a local database that may be used to maintain vicinity and channel condition information.

Figure 8:
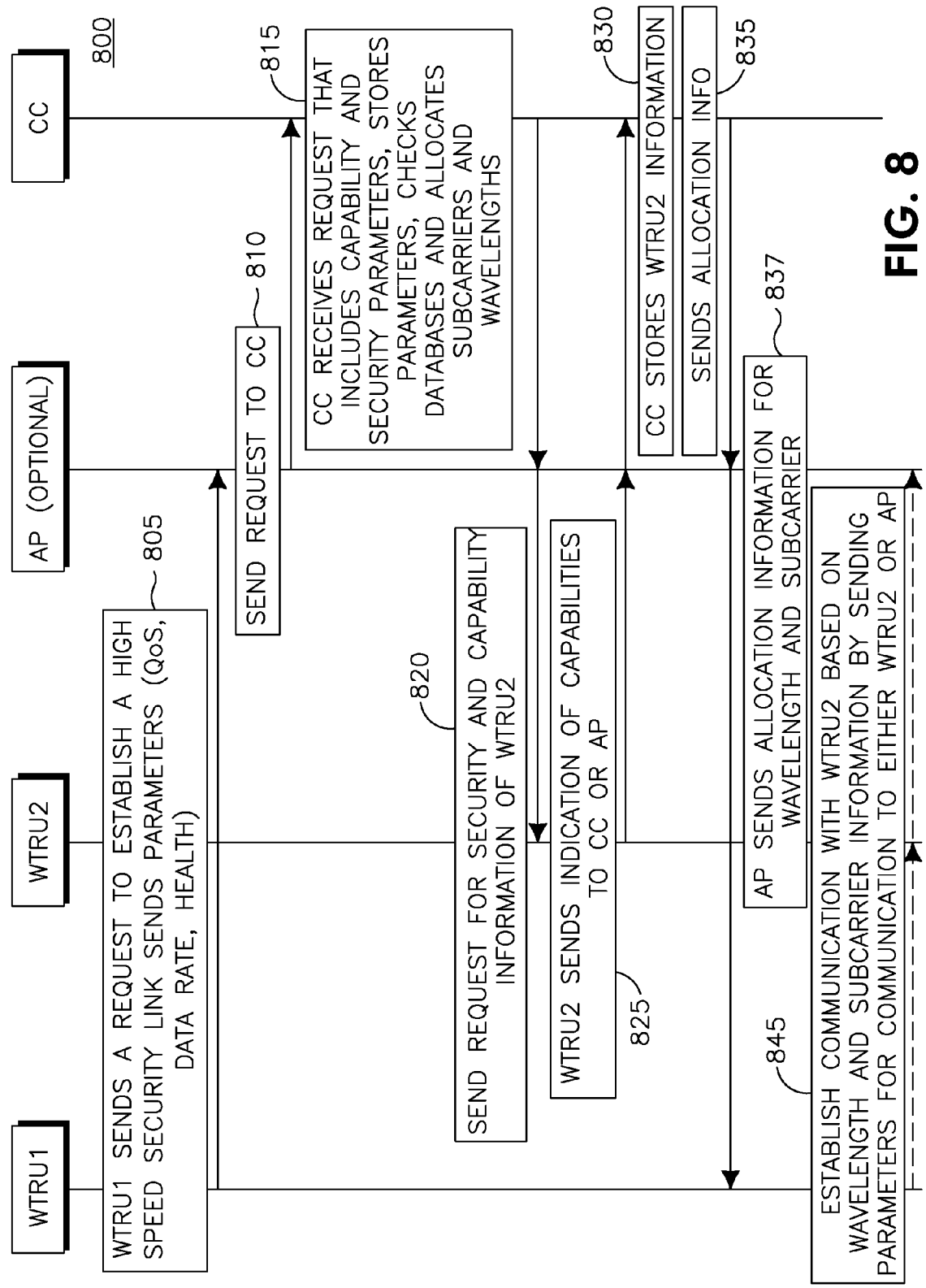
FIG. 8 shows a flow diagram of a security process.

FIG. 8 is a flow diagram of a security process 800. WTRU1 (Master) sends a request to the CC to establish a high speed security link with WTRU2 (Responder), located within the same room (Room 1) as WTRU1 805.

WTRU1 may send the request via UV or RF to an AP. The AP receives the request and may convert the message, if sent via UV, to transmit it to the CC via an RF link located outside of Room 1 810. The CC receives the request from the AP 815. If the CC is located within Room 1, WTRU1 may send the request directly to the CC via a UV or via a RF link.

The request received by the CC may include capability and security parameters for WTRU1, including but not limited to data rate, capability information, channel conditions and applications associated with WTRU1 815. The request may also include information regarding the security level for each application associated with WTRU1. A request to setup a direct link may trigger the channel sounding controller, as described herein.

Applications transmitting highly sensitive information may be assigned a higher quality of security (QoSec) level, while applications with less sensitive or insensitive information may be assigned a lower QoSec. The CC may store the parameters and the application security information in the respective databases (e.g. either the capability or the security database) 815.

The CC may send a request to WTRU2 for WTRU2's security and capability information 820. The CC may send the request either directly to WTRU2 via LTV or via RF, if the CC and WTRU2 are located in the same room, or via an AP via RF 820. If the request is sent from the CC to the AP, the AP may convert the RF message to transmit it to WTRU2 via UV 820, or may transmit the message to WTRU2 via RF. WTRU2 receives the request and WTRU2 may send security and capability information either to the AP or to the CC 825. The CC receives this information from either WTRU2 or the AP and may store the information in the respective database 830.

The CC may use the information stored in its databases and the allocation device to allocate subcarriers (i.e., OFDM) within different wavelengths (i.e., UV-A or UV-C) for each application associated with WTRU1, so that WTRU1 may establish a high speed security link with WTRU2. The selection of wavelengths may be a function of the desired link security. Wavelengths in the UV-C range may be chosen for services or applications with high QoSec requirements, while wavelengths in the UV-A range may be chosen for services or applications with low QoSec requirements. Alternatively, the wavelength selection may be made to avoid interference inside a particular room where multiple LTV direct links may be present.

The number of subcarriers allocated may be a function of the data rate that is stored. More subcarriers may be assigned for services requiring higher data rates. Subcarrier allocation may be based on maximum exposure limits received via the channel sounding procedure and stored in the capability database. One of several different waterfilling algorithms may be utilized for this process. Channel gain to noise ratio (CNR) may be derived through estimates of the channel response as well as the noise. The noise may take into account both device noise and environmental noise from the presence of UV due to sunlight, which may make its way into the room through windows.

A constraint equation may be created based on the exposure limits and the subcarriers assigned to a specified WTRU. The constraint may be applied to the waterfilling algorithm to obtain an optimal power for each subcarrier power $P_i$. If the specified WTRU is able to achieve the target data rate for the application without using all of the allocated subcarriers, it may notify the CC so that these subcarriers are included in the available subcarrier pool. Periodically (every K seconds), the waterfilling algorithm may be re-evaluated so that subcarriers may be assigned.

The above scheme may be a purely decentralized power allocation scheme wherein the power allocation decisions may be made by each WTRU. More accurate results may be obtained using a centralized allocation scheme, where the constraint equation may be solved by the CC and power allocation information may then be transmitted to each WTRU.

The wavelength and subcarrier allocation may also be made dependent on channel conditions, which may be based on information received during the channel sounding process or information received via parameters.

The CC may transmit the allocation information to the AP via an RF link if the CC is located outside of Room 1 835. The AP may transmit this information to WTRU1 via UV 837. Transmission may occur over an 802.11 network. If the CC is located within Room 1, the CC may transmit the allocation information directly to WTRU1 via UV.

WTRU1 establishes a high speed security link with WTRU2 based on the wavelength and subcarrier information received from the CC 845. WTRU1 sends a request including parameters for communication either directly to WTRU2 via UV or to the AP via UV or via RF 845. If WTRU1 sends the request to the AP, the AP receives the request and transmits the request to WTRU2 via UV or via RF 845. WTRU1 may also transmit the request directly to WTRU2 845. If WTRU2 does not support either the wavelengths or subcarriers allocated by the CC, the wavelengths and subcarriers may be re-negotiated until both are agreed upon by the WTRU1 and WTRU2 840. Once the wavelengths and subcarriers are agreed upon, the direct link communication may begin.

Figure 9:
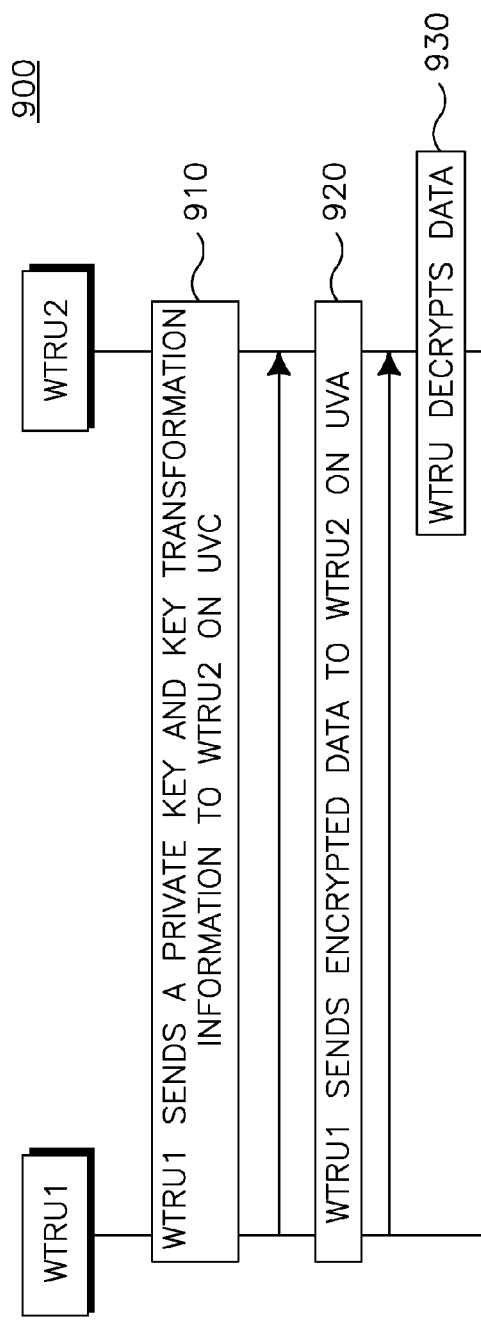
FIG. 9 shows a flow diagram of an encryption process.

FIG. 9 is a flow diagram of an encryption process 900. Symmetric encryption keys may be employed to increase data throughput in the UV link while maintaining security. Data may be encrypted and decrypted at the master and responder, WTRU1 and WTRU2, using a private key shared only by the two WTRUs.

WTRU1 may send a private key and key transformation information to WTRU2 using secure wavelengths, such as UV-C 910. To achieve higher data rates and increase network capacity, less secure wavelengths such as UV-A or RF may be utilized.

After exchanging private key information, WTRU1 may send encrypted data using UV-A 920 wavelengths which may have large bandwidth capabilities depending on the interference for a given room or at a given instant of time. WTRU2 receives the information from WTRU1 and uses the private key to decrypt the information sent using UV-A 930.

Figure 10:
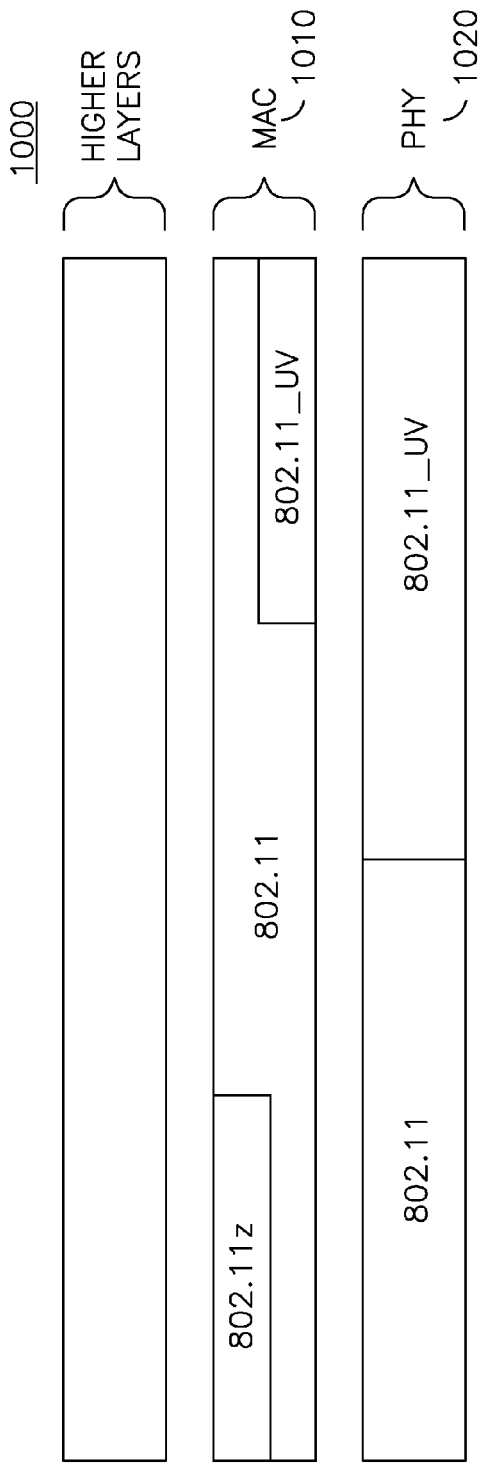
FIG. 10 shows a UV-enhanced 802.11 protocol stack for a device that supports two PHY adaptations.

FIG. 10 shows a UV-enhanced 802.11 protocol stack for a device that supports two PHY adaptations: RF and UV 1000. The 802.11_UV MAC/PHY protocols may be adaptations of the standard 802.11 protocols. The 802.11_UV MAC 1010 may extend the capabilities of the standard 802.11 MAC by providing lower-MAC functions that may be used to interface with the 802.11_UV PHY layer 1020. The 802.11_UV MAC 1010 may also include capabilities that support cross-layer optimization of QoS and security functions, wavelength/subcarrier assignment, and power management. The 802.11_UV PHY 1020 protocol may be based on an OFDM air interface. Functionality of the 802.11_UV MAC 1010 may include: association of devices, resolving QoSec requirements from higher layers into wavelength and subcarrier assignment, and/or data multiplexing and recombining in spectrum aggregation.

The CC may also be applicable to a dynamic spectrum manager (DSM), a Home NodeB (HNB), a Home enhanced Node B or a Home evolved Node B (HeNB). The HNB may be a Femto device standardized for Universal Mobile Telecommunications System (UMTS) and the HeNB may be a Femto device standardized for Long Term Evolution (LTE).

Although features and elements are described above with reference to FIG. 1-10 in particular combinations, each feature or element can be used alone without the other features and elements or in various combinations with or without other features and elements. The sub-elements of the methods or flowcharts described above with reference to FIG. 1-10 may be realized in any order (including concurrently), in any combination or sub-combination. The methods or flow charts described above with reference to FIGS. 1-10 may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

As used herein, the term "processor" includes, but is not limited to, a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

A circuit includes any single electronic component of combination of electronic components, either active and/or passive, that are coupled together to perform one or more functions. A circuit may be composed of components such as, for example, resistors, capacitors, inductors, memory stores, diodes, or transistors. Examples of circuits include but are not limited to a microcontroller, a processor, and a transceiver.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN), personal area network (PAN) or Ultra Wide Band (UWB) module.

What is claimed is:

1. A wireless transmit/receive unit (WTRU), comprising a receiver configured to:
   receive a first message from a central controller, wherein the first message is a channel sounding request that includes a request for capability information, application information, and location information;
   receive a second message from the central controller, wherein the second message is a channel sounding notification; and
   receive ultra violet (UV) secure short range communication (SSRC) signals;
a transmitter configured to:
   transmit UV SSRC signals in response to the channel sounding request including the capability information, the location information and the application information;
   transmit a request to establish a direct link via UV SSRC signals or via radio frequency (RF); and
   transmit UV SSRC signals upon completion of a direct link setup; and
a processor configured to process the received UV SSRC signals containing subcarrier and wavelength information.

2. The WTRU of claim 1 wherein the channel sounding request includes a wavelength and a time T1 for a reference signal to be sent.

3. The WTRU of claim 1 wherein the LTV SSRC signals include specific service qualities including security, data rate and interference.

4. The WTRU of claim 1 further comprising a plurality of applications wherein the applications are assigned a quality of security (QoSec) level.

5. The WTRU of claim 1 wherein the subcarriers are orthogonal frequency division multiplexing (OFDM) subcarriers.

6. The WTRU of claim 1, wherein the transmitter is configured to transmit the application information, wherein the application information is related to a level of security.

7. A central controller (CC), comprising:
   a channel sounding controller configured to transmit, to wireless transmit/receive units (WTRUs) within a predetermined vicinity, a first message and a second message, wherein the first message is a channel sounding request that includes a request for capability information, application information, and location information, and wherein the second message is a channel sounding notification;
   a receiver configured to receive a request to establish a direct link via secure short range communication (SSRC) or via radio frequency (RF), wherein the request includes the capability information, the application information and the location information;
   a processor configured to process the capability information, the location information and the application information;
   a quality of security (QoSec) database configured to store the application information;
   a capability database configured to store the capability information;
   a vicinity database configured to store the location information;
   an allocation device configured to allocate subcarriers and wavelengths based on the stored application information, the stored capability information and the stored location information; and
   a transmitter configured to transmit ultra violet (UV) SSRC signals.

8. The CC of claim 7 wherein applications are assigned a QoSec level.

9. The CC of claim 7 wherein the subcarriers are orthogonal frequency division multiplexing (OFDM) subcarriers.

10. The CC of claim 7 wherein the subcarriers and the wavelengths are allocated based on information received in the SSRC request, the information stored in the vicinity database, the information stored in the capability database or the information stored in the QoSec database.

11. The CC of claim 7 wherein the QoSec database includes a listing of WTRUs in the vicinity of the CC, applications associated with each WTRU and the QoSec for each application and/or WTRU.

12. The CC of claim 7 wherein the channel sounding controller transmits the channel sounding request including information instructing at least one WTRU to transmit a reference signal on a specified wavelength and a time T1 for the reference signal to be sent, wherein the channel sounding controller is triggered when a request for association is made to the CC, when the request to setup the SSRC with another WTRU is made, upon expiration of a timer or in response to an asymmetric event.

13. The CC of claim 7 wherein the SSRC includes specific service qualities including security, data rate and interference.

14. The CC of claim 7, wherein the QoSec database is configured to store the application information, wherein the application information is related to a level of security.

15. A method for providing peer-to-peer (P2P) communications in a secure short range communication (SSRC) personal area network (PAN) for use by a central controller (CC), comprising:
   transmitting, to wireless transmit/receive units (WTRUs) within a predetermined vicinity, a first message and a second message, wherein the first message is a channel sounding request for capability information, application information and location information, and wherein the second message is a channel sounding notification;
   receiving a request to establish the SSRC wherein the request includes the capability information, the application information and the location information;
   storing the capability information, the location information and the application information;
   processing the capability information, the location information and the application information;
   allocating subcarrier and wavelength resources based on the information received in the SSRC request, the information stored in a vicinity database, the information stored in a capability database or the information stored in a QoSec database; and transmitting ultra violet (UV) SSRC signals.

16. The method of claim 15 wherein applications are assigned a quality of security (QoSec) level wherein the QoSec levels are based upon information received in the SSRC request, based upon environment conditions or based upon characteristics of a room where the SSRC is maintained.

17. The method of claim 15 wherein the subcarriers are orthogonal frequency division multiplexing (OFDM) subcarriers and are allocated based on a waterfilling algorithm wherein the waterfilling algorithm includes maximum exposure limits.

18. The method of claim 15 wherein the subcarriers and the wavelengths are allocated based on information received in the SSRC request, the information stored in the vicinity database, the information stored in the capability database or the information stored in the QoSec database.

19. The method of claim 15 wherein the channel sounding request includes a wavelength and a time T1 for a reference signal to be sent.

20. The method of claim 15 wherein the channel sounding request is triggered when a request for association is made to the CC, when the request to setup the SSRC with another WTRU is made, upon expiration of a timer or in response to an asymmetric event.

21. The method of claim 15, wherein the application information is related to a level of security.

* * * * *